United States Patent
Schmidt et al.

(10) Patent No.: US 7,125,355 B2
(45) Date of Patent: Oct. 24, 2006

(54) CONTINUOUSLY VARIABLE TRANSMISSION

(75) Inventors: Jens Schmidt, Langenargen (DE); Richard Stark, Bühlertal (DE); Remi Leorat, Strassburg (FR)

(73) Assignee: ZF Friedrichshafen AG, Friedrichshafen (DE)

( * ) Notice: Subject to any disclaimer, the term of this patent is extended or adjusted under 35 U.S.C. 154(b) by 257 days.

(21) Appl. No.: 10/667,215

(22) Filed: Sep. 19, 2003

(65) Prior Publication Data

US 2004/0082416 A1  Apr. 29, 2004

(30) Foreign Application Priority Data

Sep. 27, 2002   (DE) ................. 102 45 588

(51) Int. Cl.
*F16H 57/04* (2006.01)
*B05B 1/14* (2006.01)

(52) U.S. Cl. ................. 474/91; 239/567; 239/553.5

(58) Field of Classification Search ............ 474/43–45, 474/18, 28, 91; 239/403, 492, 566, 552, 239/567, 530, 553.5, 561
See application file for complete search history.

(56) References Cited

U.S. PATENT DOCUMENTS

| 5,605,513 | A | * | 2/1997 | Van Der Hardt Aberson 474/91 |
| 5,800,299 | A | * | 9/1998 | Lamers et al. ................ 474/91 |
| 6,053,431 | A | * | 4/2000 | Hurley et al. ............... 239/492 |
| 6,199,566 | B1 | * | 3/2001 | Gazewood .................. 239/403 |
| 6,626,781 | B1 | * | 9/2003 | Van Der Kamp et al. .... 474/91 |
| 6,764,030 | B1 | * | 7/2004 | Habib et al. ................ 239/566 |
| 2002/0013189 | A1 | | 1/2002 | Van Der Kamp et al. .... 474/91 |

FOREIGN PATENT DOCUMENTS

| DE | 198 53 334 A1 | 5/1999 |
| EP | 0 574 085 B1 | 9/1996 |
| EP | 0 894 535 A1 | 2/1999 |
| JP | 63-3096 A * | 1/1988 |
| JP | 02-150549 A * | 6/1990 |
| JP | 10-141459 A * | 5/1998 |

* cited by examiner

*Primary Examiner*—Marcus Charles
(74) *Attorney, Agent, or Firm*—Davis & Bujold, P.L.L.C.

(57) ABSTRACT

A regulatable continuously variable transmission in which one multiple-jet nozzle (4) is used for supplying cooling and lubricant oil to the variator. The flow diameter (9, 10) of the nozzle (4) is created so that a stationary flow exists in the nozzle (4) and the continuity equation results in a constant value.

9 Claims, 2 Drawing Sheets

CONTINUOUSLY VARIABLE TRANSMISSION

FIELD OF THE INVENTION

The invention relates to a regulatable continuously variable transmission, especially for motor vehicles.

BACKGROUND OF THE INVENTION

Those continuously variable transmissions are generally known. Common continuously variable transmissions have one variator for ratio adjustment which comprises one first cone pulley pair upon one primary shaft and one second cone pulley pair upon one secondary shaft and one encircling device running between the cone pulley pairs. Each cone pulley pair consists of one first pulley, stationary in an axial direction, and one second cone pulley, movable in an axial direction. In accordance with the shafts, the cone pulley pairs are called primary and secondary pulley sets.

To guarantee operation of the transmission without problems, lubrication and a cooling of the whole variator must be provided for. To that end, both cone pulley pairs are usually supplied with lubricant and cooling oil by special nozzles.

In the nozzles, hitherto known of course, it is often not possible to produce substantially equally good jets. Individual jets often split too strongly with the consequence that the cone pulley sets are not optimally lubricated and cooled. Increasing the difficulty, the existing installation space is very limited and ease for assembly must be kept in mind.

A transmission of the above mentioned kind with lubricant and cooling oil supply has been disclosed in EP 0 547 085 B1. In FIG. 2, is shown a so-called liquid supply capillary tube having two holes. The oil is conveyed into the lubrication pipe and again emerges from the two holes. The oil jets then strike on specific areas of the cone pulleys. In FIG. 6, one nozzle with three holes is shown whereby the second cone pulley pair is also to be supplied with oil.

It is disadvantageous in this design that in case of a constant flow diameter for the nozzle, the holes lie consecutively in the flow direction. Due to the emergency of the first oil jet, the oil in the nozzles is so swirled that it affects the further course of the flow. It is thus hardly possible that the emerging oil jet from the second discharge opening can optimally supply a specific area with oil.

The problem on which the invention is based consists in developing a nozzle with which cone pulley pairs of a continuously variable transmission are supplied with sufficient cooling and lubricant oil, it being necessary to bear in mind ease of assembly and small need of space.

SUMMARY OF THE INVENTION

The inventive multiple-jet nozzle has a flow diameter in its interior which diminishes in the flow direction. The flow diameter is graduated so that steady, uniform flow always prevails in the nozzle.

The inventive nozzle obtains that the flow remains stationary in the nozzle. The flow diameter needed, therefore, is determined by using the continuity equation and adapting the inner diameter of the nozzle accordingly. By this adaptation of the flow diameter of the nozzle the swirling of the oil is stopped, due to the emerging jet. When the flow is stationary in the nozzle, the same flow conditions prevail all over and all the oil jets issuing from the nozzle can be made available in the same quality. An effective and optimal oil supply can thus be ensured.

BRIEF DESCRIPTION OF THE DRAWINGS

The invention will now be described, by way of example, with reference to the accompanying drawings in which.

DETAILED DESCRIPTION OF THE INVENTION

Figure 1:
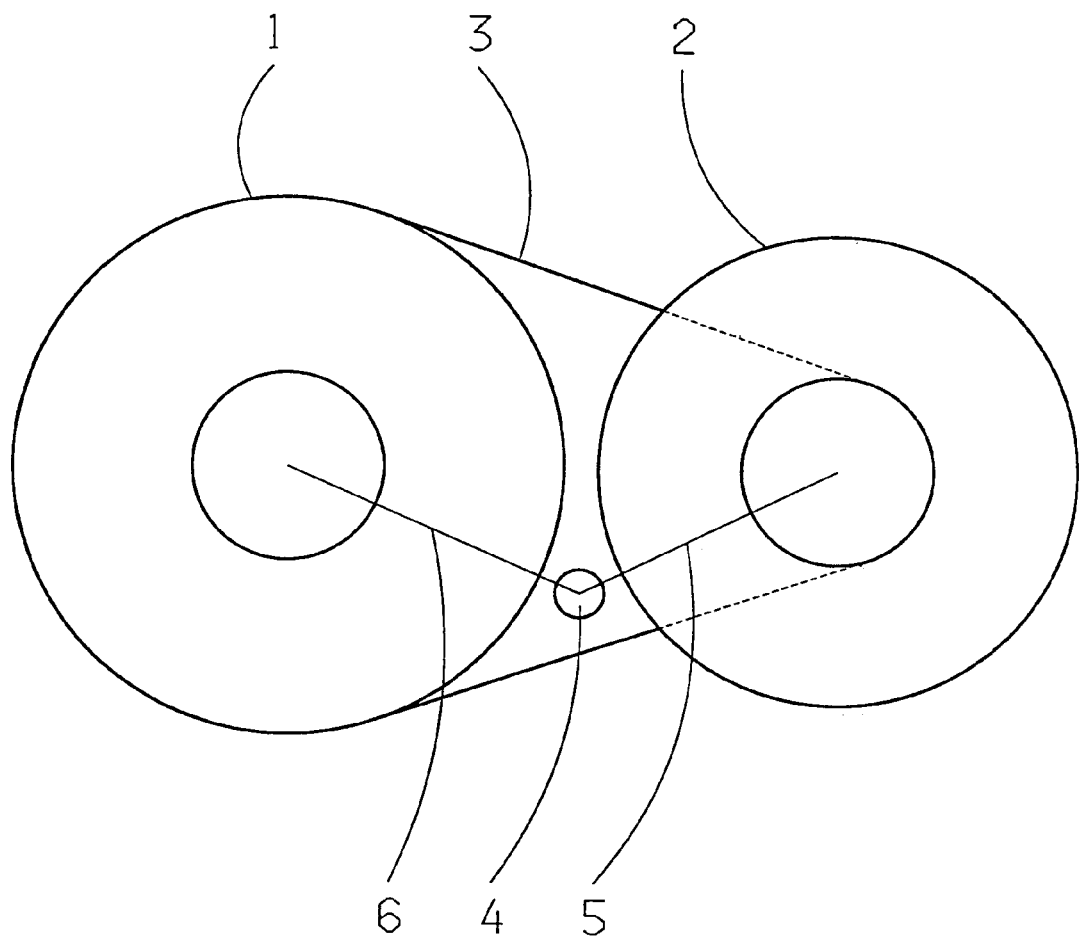
FIG. 1 is an outline of the arrangement of the nozzle.

FIG. 1 shows an advantageous arrangement of two cone pulley pairs 1, 2 and of a multiple-jet nozzle 4. The nozzle 4 is situated between the pulley pairs 1, 2. The orientation of the oil jets 5, 6 to a primary and secondary shaft upon which the pulley pairs 1, 2 are placed is detected for both jest 5, 6. Starting from the shafts the lubricant and cooling oil is conveyed via the pulley pairs 1, 2 radially outwards by rotation. It also reaches the encircling device 3.

The oil is distributed onto the primary and secondary pulley sets such that a ratio of the oil volume flow for the first pulley pair (1) to the oil volume flow for the second pulley pair (2) is in the range of from 35:65 to 45:55 and more preferably about 40% for the primary pulleys and 60% for the secondary pulleys. It is also possible to spray the oil jets directly on the cone pulleys but not on the shaft.

Figure 2:
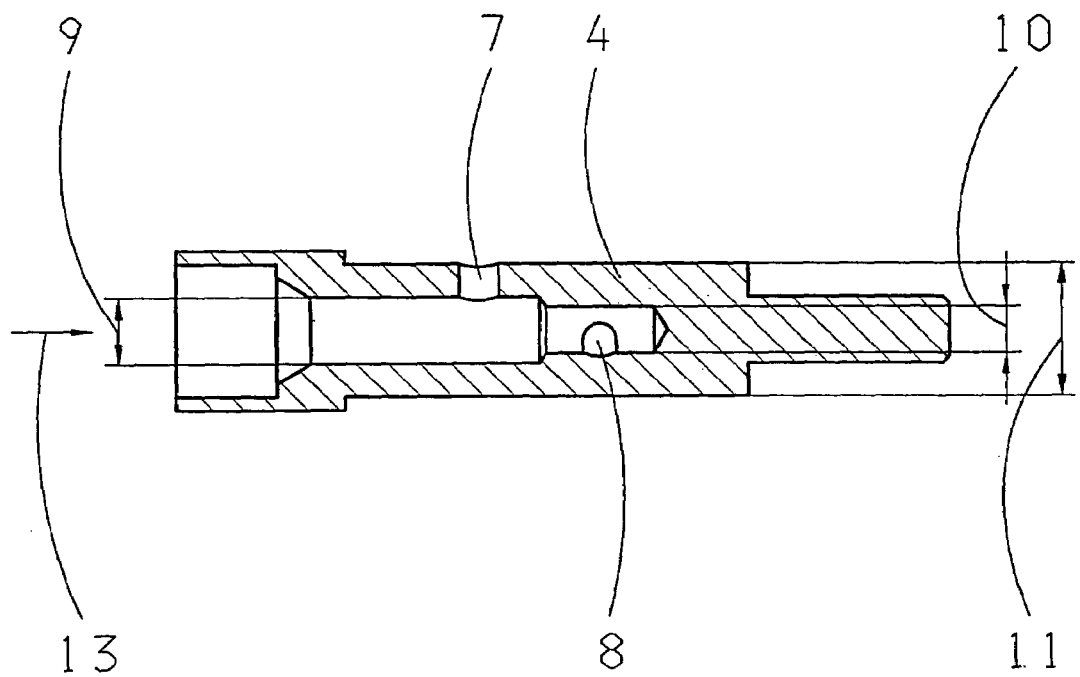
FIG. 2 is a longitudinal sectional representation of the nozzle.

FIG. 2 shows an advantageous development of the nozzle 4 in axial section.

The nozzle 4 is loaded with oil along flow direction 13. The oil then again issues from the discharge openings 7, 8 forming the oil jets 5, 6. The first flow diameter ($D\_1$) 9 are the first discharge opening 7 is larger than the second flow diameter ($D\_2$) 10 for the second discharge opening 8. The outer diameter 11 of the nozzle 4 in the area of both discharge openings 7, 8 is designated with $D\_3$. The guide length of the first oil jet 5 is formed from one half the difference $D\_3-D\_1$, the guide length of the second oil jet is formed from one half the difference $D\_3-D\_2$.

In flow direction 13, the discharge opening 7 is formed along the first flow diameter 9. The oil there has a flow rate $v\_1$. The second discharge opening 8 is formed along the second flow diameter 10, with the oil flowing at the rate $v\_2$. By using the continuity equation ("the product from flow rate and cross section is constant") in the inventive solution a steady state flow is obtained with $v\_1=v\_2$ in the whole area of the discharge openings 7, 8 by the second flow diameter 10 being accordingly adapted. The first flow diameter 9 is selected here so that its cross section corresponds at least to the sum of the first and of the second discharge openings 7, 8.

An advantage of the inventive solution is that by graduating the flow diameters 9, 10, the swirling of the flow in the flow direction, resulting from the oil emerging from the first discharge opening 7, is interrupted. Thereby the second oil jet 6 is no longer influenced and the oil jets 5, 6 emerging from the nozzle 4 can both be made available in the same quality. An effective and optimal oil supply can thus be ensured.

Another advantage is that the guide length of the second oil jet 6 is larger than that of the first oil jet 5, due to the graduation of the flow diameters 9, 10. By virtue of the larger guide length of the second oil jet 6, splitting of the jet 6 is additionally prevented whereas the second oil jet, in the solutions known already, is certainly poorer in general than the first oil jet 5. At the same time, no additional guide tubes, which would then project over the nozzle 4, have to be inserted in the nozzle 4. This is a great advantage for ease of assembly and the installation space need of the nozzle 4.

The inventive nozzle 4 advantageously has two discharge openings 7, 8 which respectively supply one cone pulley pair 1, 2 with oil. But two or more jets are also possible for at least one of the pulley pairs 1, 2. When several discharge openings are provided for one pulley pair 1, 2, the distance thereof in the flow direction can, of course, be so small that a swirling of the flow between the narrowly adjacent discharge openings is negligible. A graduation of the flow diameter might possibly be unnecessary there, one graduation having to be made for the next cone pulley pair, in any case before the discharge opening.

Figure 3:
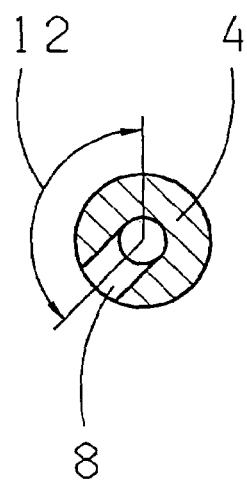
FIG. 3 is a radial cross sectional representation of the nozzle.

FIG. 3 shows the inventive nozzle 4, in a radial section, in the area of the second discharge opening 8. The angle 12 is detected by which the second discharge opening 8 is displaced in a peripheral direction opposite the first discharge opening 7.

In one other advantageous development, at least one of the two holes of the flow diameters 9, 10 can be designed eccentric so as to enlarge the relevant guide length of the discharge openings 7, 8.

REFERENCE NUMERALS 1 pulley pair 1
2 pulley pair 2
3 encircling device
4 nozzle
5 first oil jet
6 second oil jet
7 first discharge opening
8 second discharge opening
9 first flow diameter D_1
10 second flow diameter D_3
11 outer diameter D_3
12 angle between the discharge openings\13
13 flow direction

The invention claimed is:

1. A regulatable continuously variable transmission for a motor vehicle comprising:
an encircling device (3) which rotates around first and second pairs of cone pulleys (1, 2), the first pair of cone pulleys (1) is disposed on an input shaft and the second pair of cone pulleys (2) is disposed on an output shaft, and both the first and second pairs of cone pulleys (1, 2) each have an axially fixed cone pulley and an axially movable cone pulley, and cabling and lubricating oil being supplied to the encircling device (3) and the first and second pairs of cone pulleys (1, 2) via a nozzle;
wherein the nozzle includes a plurality of discharge openings (7, 8) spaced along and communicating with a fluid supply passage having a flow diameter (9, 10) that diminishes in a flow direction (13) between discharge openings (7, 8) so that at each flow diameter (9, 10), a product of a fluid flow rate and a cross section area of the flow diameter (9, 10) is a constant.

2. The transmission according to claim 1, wherein the flow diameter (9, 10) changes such that a steady uniform flow prevails in the multiple-jet nozzle (4).

3. The transmission according to claim 1, wherein a ratio of an oil volume flow for the first pulley pair (1) to an oil volume flow for the second pulley pair (2) ranges from 45:55: to 35:65.

4. The transmission according to claim 1, wherein the flow diameter (9, 10) of the multiple-jet nozzle (4) has a different value for each of the first and the second discharge openings (7, 8).

5. The transmission according to claim 1, wherein the multiple-jet nozzle (4) only has the first and the second discharge openings (7, 8).

6. The transmission according to claim 1, wherein an outer diameter (11) of the multiple-jet nozzle (4), between the at least first and second discharge openings (7, 8), is constant.

7. The transmission according to claim 1, wherein a ratio of an oil volume flow for the first pulley pair (1) to an oil volume flow for the second pulley pair (2) is about 40:60.

8. A nozzle for supplying lubrication and cooling fluid to a continuously variable transmission for a motor vehicle, the nozzle comprising:
a fluid supply passage for supplying the nozzle with lubrication and cooling fluid for lubricating and cooling both a primary cone pulley set and a secondary cone pulley set connected with one another by a rotatable belt; and
an input shaft supporting the primary cone pulley set and an output shaft supporting the second cone pulley set, and both the primary and the secondary cone pulley sets each comprise a pair of cone pulleys (1, 2) with one pulley being an axially fixed cone pulley and another pulley being an axially movable cone pulley;
wherein the fluid supply passage in the nozzle communicates with first and second axially separated discharge openings and an initial diameter of the fluid supply passage diminishes between the first and second discharge openings, and the second discharge opening has a smaller diameter than the first discharge opening to provide a steady uniform fluid flow in the area of the first and second discharge openings; and
the initial diameter of the fluid supply passage defines a cross-section which corresponds at least to a sum of a cross-section of each said first and said second discharge openings (7, 8).

9. A continuously variable transmission for a motor vehicle comprising:
an encircling device (3) which rotates around a first and a second pair of cone pulleys (1, 2), the first pair of cone pulleys (1) is disposed on an input shaft and the second pair of cone pulleys (2) is disposed on an output shaft, and both the first and
a single, multiple jet nozzle for supplying cooling and lubricating fluid to the encircling device (3) and the first and second pairs of cone pulleys (1, 2); and
wherein the multiple jet nozzle further comprises a fluid supply passage communicating with only first and second discharge openings with the first discharge opening being axially spaced from the second discharge opening, and a flow diameter of the fluid supply passage diminishes between the first and second discharge openings, and the second discharge opening has a smaller diameter than the first discharge passage to provide a steady uniform fluid flow in the area of the first and second discharge openings.

* * * * *